United States Patent
Yang et al.

(10) Patent No.: US 11,139,517 B2
(45) Date of Patent: Oct. 5, 2021

(54) BATTERY PACK COMPRISING ELECTRODE TERMINAL CONNECTION PLATE

(71) Applicant: LG CHEM, LTD., Seoul (KR)

(72) Inventors: Kun Joo Yang, Daejeon (KR); Yong Jun Cho, Daejeon (KR); Seog Jin Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 144 days.

(21) Appl. No.: 16/340,004

(22) PCT Filed: Dec. 20, 2017

(86) PCT No.: PCT/KR2017/015067
§ 371 (c)(1),
(2) Date: Apr. 5, 2019

(87) PCT Pub. No.: WO2018/135763
PCT Pub. Date: Jul. 26, 2018

(65) Prior Publication Data
US 2020/0035959 A1    Jan. 30, 2020

(30) Foreign Application Priority Data
Jan. 19, 2017   (KR) ........................ 10-2017-0008969

(51) Int. Cl.
*H01M 50/107* (2021.01)
*H01M 50/213* (2021.01)
(Continued)

(52) U.S. Cl.
CPC ....... *H01M 50/107* (2021.01); *H01M 50/213* (2021.01); *H01M 50/50* (2021.01);
(Continued)

(58) Field of Classification Search
CPC ........ H01M 2/20; H01M 2/22; H01M 10/482; H01M 2/26; H01M 2/263; H01M 2/266;
(Continued)

(56) References Cited

U.S. PATENT DOCUMENTS 6,034,331 A * 3/2000 Tsukagoshi ............. H01L 24/29
174/250
6,627,345 B1 9/2003 Zemlok et al.
(Continued)

FOREIGN PATENT DOCUMENTS

CN    1213189 A    4/1999
CN    1753218 A    3/2006
(Continued)

OTHER PUBLICATIONS

Utsuro, Hidetoshi et al. "Battery module and method for welding battery module"; Publication No. WO 2012/063381 A1 (Year: 2012).*
(Continued)

*Primary Examiner* — Magali P Slawski
*Assistant Examiner* — Jessie L. Walls
(74) *Attorney, Agent, or Firm* — Birch, Stewart, Kolasch & Birch, LLP

(57) ABSTRACT

The present disclosure provides a battery pack including a plurality of cylindrical battery cells forming a clamping part by coupling a cap assembly on one opened surface of a cylindrical can and forming a first electrode terminal and a second electrode terminal on a top surface of the clamping part and a top end central portion of the cap assembly, respectively, and a first electrode terminal connecting plate simultaneously coupled to upper end surfaces of the clamping parts of the battery cells in a state in which cylindrical battery cells are laterally arranged so that the cap assemblies of the cylindrical battery cells head in the same direction.

(Continued)

The first electrode terminal connecting plate includes a welding plate having a relatively thin thickness to be welded on the upper end surface of the clamping part of the cap assembly, and a conductive plate coupled to a top surface of the welding plate, which is opposite to the cap assembly, and having a relatively thick thickness in comparison with that of the welding plate for smooth current flow between first electrode terminals of the upper end surface of the clamping part.

13 Claims, 3 Drawing Sheets

(51) Int. Cl.
   *H01M 50/502* (2021.01)
   *H01M 50/516* (2021.01)
   *H01M 50/55* (2021.01)
   *H01M 50/505* (2021.01)
   *H01M 50/50* (2021.01)
   *H01M 50/543* (2021.01)
   *H01M 50/10* (2021.01)
   *H01M 50/54* (2021.01)

(52) U.S. Cl.
   CPC ....... *H01M 50/502* (2021.01); *H01M 50/505* (2021.01); *H01M 50/516* (2021.01); *H01M 50/54* (2021.01); *H01M 50/55* (2021.01); *H01M 50/10* (2021.01); *H01M 50/543* (2021.01)

(58) Field of Classification Search
   CPC ...... H01M 2/10; H01M 2/105; H01M 50/505; H01M 50/516
   See application file for complete search history.

(56) References Cited

U.S. PATENT DOCUMENTS

| | | | |
|---|---|---|---|
| 8,329,333 B2 | 12/2012 | Kim et al. | |
| 2005/0070164 A1* | 3/2005 | Mita | H01M 2/204 |
| | | | 439/627 |
| 2005/0079408 A1 | 4/2005 | Hirano | |
| 2006/0003222 A1 | 1/2006 | Mushiga et al. | |
| 2010/0151312 A1 | 6/2010 | Kim et al. | |
| 2011/0171504 A1 | 7/2011 | Yasui et al. | |
| 2011/0171515 A1 | 7/2011 | Itoi et al. | |
| 2013/0236769 A1* | 9/2013 | Bang | H01M 50/528 |
| | | | 429/159 |
| 2016/0315303 A1 | 10/2016 | Eberhard | |
| 2017/0194610 A1 | 7/2017 | Tschiggfrei et al. | |
| 2018/0108899 A1* | 4/2018 | Fees | B60K 11/02 |

FOREIGN PATENT DOCUMENTS

| | | | |
|---|---|---|---|
| CN | 101523635 A | 9/2009 | |
| CN | 102177603 A | 9/2011 | |
| CN | 103415942 A | 11/2013 | |
| CN | 105229820 A | 1/2016 | |
| CN | 105514338 A | 4/2016 | |
| CN | 205645972 U | 10/2016 | |
| JP | 2-1860 U | 1/1990 | |
| JP | 2001-43839 A | 2/2001 | |
| JP | 2005-235638 A | 9/2005 | |
| JP | 2010-15906 A | 1/2010 | |
| JP | 2010-282811 A | 12/2010 | |
| JP | 2014-157770 A | 8/2014 | |
| JP | WO 2015/186168 A1 * | 12/2015 | .............. H01M 2/20 |
| KR | 10-2011-0042358 A | 4/2011 | |
| KR | 10-2011-0042376 A | 4/2011 | |
| KR | 10-1168880 B1 | 7/2012 | |
| KR | 10-2013-0041232 A | 4/2013 | |
| KR | 10-1283347-BI | 7/2013 | |
| KR | 10-1520873 B1 | 5/2015 | |
| KR | 10-2016-0079220 A | 7/2016 | |
| KR | 10-2016-0149285 A | 12/2016 | |
| WO | WO-2012053610 A1 * | 4/2012 | .............. H01M 4/72 |
| WO | WO2012/063381 A1 | 5/2012 | |
| WO | WO 2015/105335 A1 | 7/2015 | |

OTHER PUBLICATIONS

Yamada Hidaka et al. "Power storage device"; JP 2014-157770 A; (Year: 2014).*

Kagiya, Kazuhiko "Laser welding method and battery pack"; Publication No. WO 2015/186168 A1; (Year: 2015).*

Utsuro, Hidetoshi—WO 2012/063381 A1—figures annotated by examiner are attached as separate NPL document.*

European Search Report for Appl. No. 17892888.3 dated May 6, 2019.

International Search Report for PCT/KR2017/015067 (PCT/ISA/210) dated Mar. 30, 2018.

* cited by examiner

[Fig. 1]
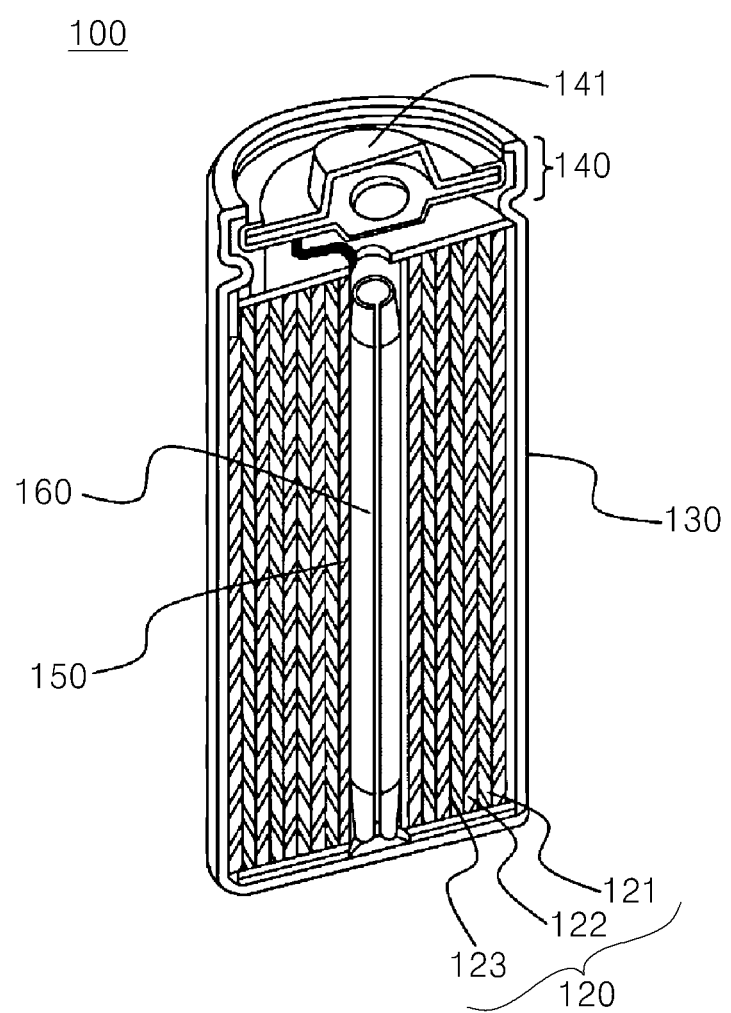

[Fig. 2]
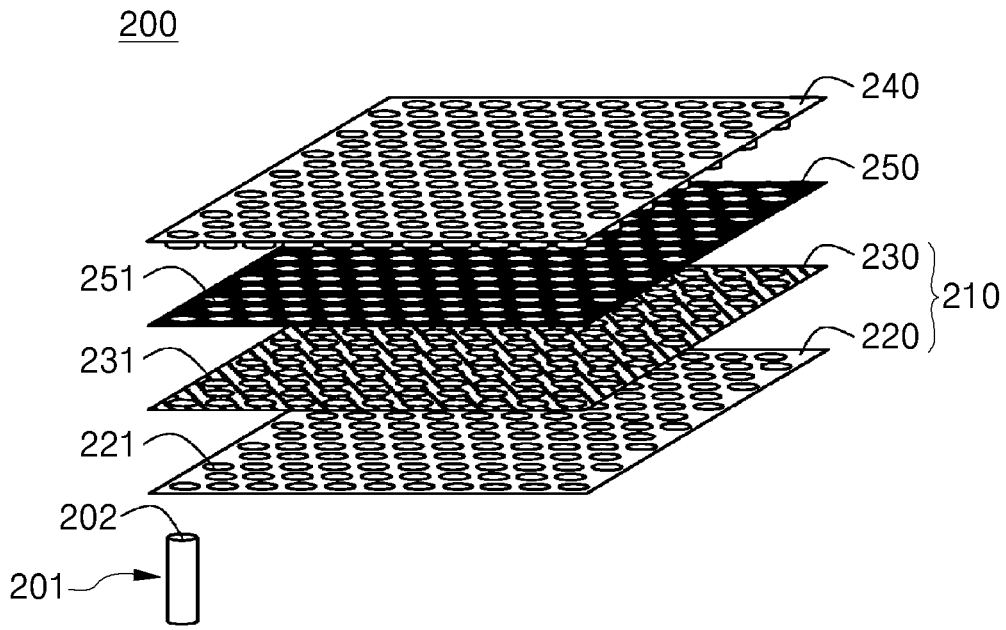
[Fig. 3]
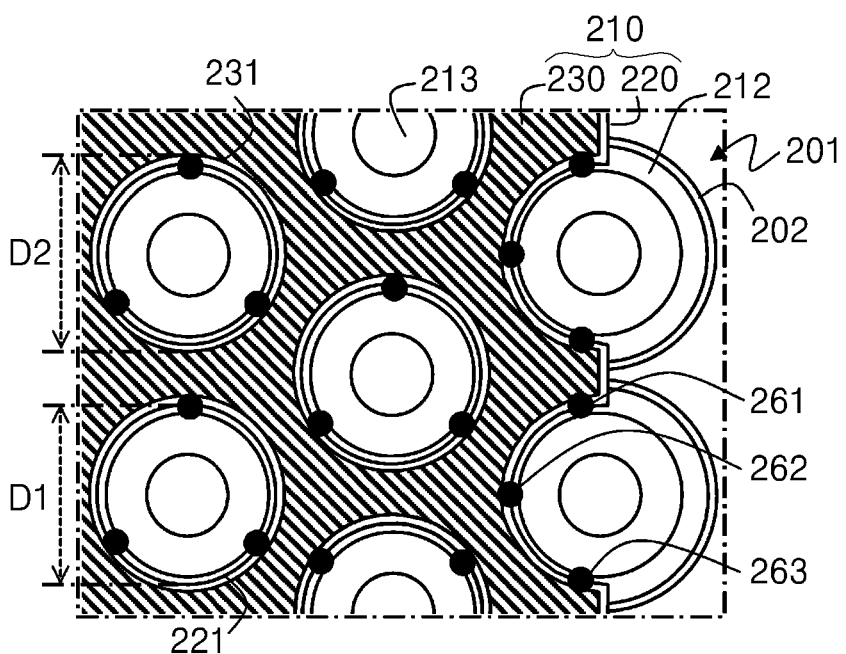

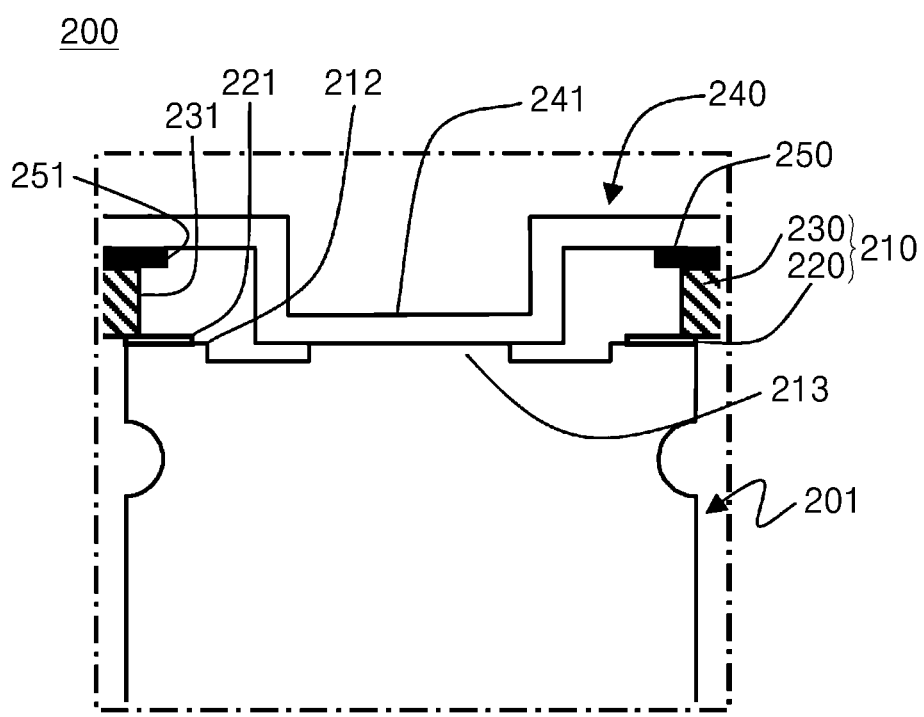
[Fig. 4]

BATTERY PACK COMPRISING ELECTRODE TERMINAL CONNECTION PLATE

TECHNICAL FIELD

The present disclosure relates to a battery pack including an electrode terminal connecting plate.

BACKGROUND ART

In recent years, as an energy source increases in price due to depletion of fossil fuel, and interest on environment pollution increases, environment friendly alternative energy sources are demanded as an essential factor for future living.

Accordingly, technologies for producing various powers such as a solar energy, a wind power, and a tidal power have been researched, and a power storage apparatus for effectively using a produced energy has been also drawn attention.

Particularly, as technical development and demands for mobile devices have increased, demands for batteries as energy sources are rapidly increasing, and thus more researches on the batteries are being carried out to cope with such diverse demands.

Representatively, rectangular secondary batteries and pouch-type secondary batteries, which have a thin thickness in terms of a shape of a battery and thus are applicable to a mobile phone, are highly demanded, and lithium secondary batteries such as lithium-ion batteries and lithium-ion polymer batteries, which have advantages such as high energy density, high discharge voltage, and output stability in terms of a material, are highly demanded.

Also, the secondary batteries are classified on the basis of a structure of an electrode assembly in which an anode, a cathode, and a separator disposed between the anode and the cathode are laminated. Representatively, the secondary batteries may be classified into a jelly-roll type (winding-type) electrode assembly having a structure in which long sheet-type anodes and cathodes with separators disposed therebetween are wound and a stack-type (lamination-type) electrode assembly having a structure in which a plurality of anodes and cathodes, which are cut into a predetermined size, are sequentially laminated with separators disposed therebetween.

In recent years, a stack/folding-type electrode assembly, which is an electrode assembly having an advanced structure in which the jelly-roll-type and the stack-type are mixed, having a structure, in which unit cells that are formed by laminating anodes and cathodes in a predetermined unit with separators therebetween are sequentially wound while being disposed on separation films, has been developed to solve limitations of the jelly-roll-type electrode assembly and the stack-type electrode assembly.

Also, the secondary batteries are classified into cylindrical batteries and rectangular batteries, in which an electrode assembly is built in a cylindrical or rectangular metallic can, and pouch-type batteries in which an electrode assembly is built in a pouch-type case made of an aluminum laminate sheet according to the shape of the battery case.

The secondary batteries may be used in a single battery type or a battery pack type in which a plurality of unit batteries are electrically connected according to the kinds of external devices to which the secondary batteries are used.

For example, while small-sized devices such as a mobile phone is operated for a predetermined time by using the output and capacity of one battery, notebook computers and small-sized personal computer (PC) are required to use a battery pack in which a plurality of cylindrical batteries are connected in parallel or series for securing the required output and capacity of the batteries.

In general, the cylindrical batteries are more desirably than the rectangular or polymer batteries in terms of the capacity and the output.

FIG. 1 is a schematic vertical cross-sectional view illustrating a structure of a conventional cylindrical battery cell.

Referring to FIG. 1, a cylindrical battery cell 100 is manufactured in such a manner that an electrode assembly 120 having a winding-type structure in accommodated in a cylindrical cell case 130, an electrolyte is injected into the cell case 130, and then a cap assembly 140 is coupled to an opened upper end of the cell case 130 in a clamping manner.

A positive terminal is provided on an upper end central portion 141 of the cap assembly 140, and a negative terminal is provided on the rest portion of the cylindrical battery cell 100 except for the upper end central portion 141 of the cap assembly 140.

The electrode assembly 120 is manufactured such that an anode 121, a cathode 122, and a separator 123 are sequentially laminated and wound in a round shape.

A cylindrical center pin 160 is inserted into a through-type winding core 150 defined in a central portion of the electrode assembly 120.

In general, the center pin 160 is made of a metallic material to apply a predetermined strength and has a hollow cylindrical structure formed by bending a plate into a round shape.

Such a center pin 160 serves to fix and support the electrode assembly 120 and serves as a passage through which a gas generated by an internal reaction during charging, discharging, and operating is discharged.

In general, a battery pack used for a notebook computer and a small-sized personal computer (PC) has a structure in which a protection circuit module (PCM) is connected to a battery cell array formed by connecting a plurality of cylindrical batteries in a parallel or series manner, and mounted inside a pack case or a case member.

Here, the battery cell arrays are electrically connected to each other in such a manner that connecting members made of a metal plate are coupled to electrode terminals of the battery cells through welding, respectively.

Here, the connecting members are coupled to upper and lower ends, which are disposed opposite to each other, of the cylindrical battery cell according to polarities, respectively, in order to minimize mutual interference between the connecting members and prevent a limitation of internal short caused by the interference.

However, as the connecting members are disposed on both the upper end and the lower end, which are opposite to each other, of each of the cylindrical battery cells, the above-described structure may generate a structural limitation such as a case in which the above components may not be installed on the upper end or the lower end of each of the cylindrical battery cells in a process of coupling and arranging some components of the battery pack.

Also, due to the above-described structure, a welding for the connecting member is performed on one portion of the upper end or the lower end, on which the cap assembly of each of the battery cells is disposed, in a welding process for connecting the cylindrical battery cells.

After the welding for the one portion is completed, the battery cells are turned upside down to perform a welding for the connecting member on the other portion. Thus, the above-described welding process is inconvenient and causes increase in time and cost.

Resultantly, a structure in which the connecting members are coupled to an anode terminal and a cathode terminal at the same portion as the upper end portion on which the cap assemblies of the cylindrical battery cells are disposed may be considered.

However, while the anode terminal is provided on the upper end central portion of the cap assembly, which has a relatively wide area, the cathode terminal is provided on the upper end surface of the clamping part, which has a relatively narrow area, among the rest portion except for the upper end central portion of the cap assembly.

Accordingly, welding of the connecting member with respect to the upper end surface of the clamping part is relatively difficult. When the connecting member has a thin thickness to solve the difficulty in welding, as resistance of the connecting member increases, heat may be generated between the cathode terminals of the cylindrical battery cells while current flows, and the heat may serve as a factor degrading the stability of the battery pack.

That is, the connecting member coupled to the upper end surface of the clamping part of the cylindrical battery cell necessarily has a structure to be easily welded to the upper end surface of the clamping part and simultaneously allow current flow between the cathode terminals to be smoothly performed.

Thus, a technology for fundamentally solving the above-described limitations is highly demanded.

DISCLOSURE OF THE INVENTION

Technical Problem

The present disclosure is aimed to solve a limitation of the related art and a technical subject requested from the past.

The inventors of this application have researched in-depth and have repeated various experiments. As a result, a first electrode terminal connecting plate that is coupled to upper end surfaces of clamping parts of battery cells includes a welding plate and a conductive plate, which have different thicknesses.

Accordingly, welding of the first electrode terminal connecting plate with respect to the upper end surface of the clamping part may be more easily performed through the welding plate, and, at the same time, current flow between first electrode terminals may be smoothly performed through the conductive plate, so as to improve stability.

Also, as both the first electrode terminal connecting plate and the second electrode terminal connecting plate are coupled to an upper end of a cap assembly, other components configuration the battery pack may be disposed on a lower end portion of cylindrical battery cells, which is opposite to the upper end of the cap assembly, and thus, a structure of the battery pack may be more smoothly configured.

Thus, limitations on various shapes of a mounting portion of a device due to the structure of the battery pack may be easily solved. Resultantly, the present invention has been completed.

Technical Solution

In accordance with an exemplary embodiment, a battery pack includes: a plurality of cylindrical battery cells forming a clamping part by coupling a cap assembly on one opened surface of a cylindrical can and forming a first electrode terminal and a second electrode terminal on a top surface of the clamping part and a top end central portion of the cap assembly, respectively, and a first electrode terminal connecting plate simultaneously coupled to upper end surfaces of the clamping parts of the battery cells in a state in which cylindrical battery cells are laterally arranged so that the cap assemblies of the cylindrical battery cells head in the same direction. The first electrode terminal connecting plate includes: a welding plate having a relatively thin thickness to be welded on the upper end surface of the clamping part of the cap assembly; and a conductive plate coupled to a top surface of the welding plate, which is opposite to the cap assembly, and having a relatively thick thickness in comparison with that of the welding plate for smooth current flow between first electrode terminals of the upper end surface of the clamping part.

Accordingly, through the welding plate, welding of the first electrode terminal connecting plate with respect to upper end surfaces of the clamping part may be more easily performed, and, at the same time, smooth current flow between first electrode terminals may be performed through the conductive plate, so as to improve stability. As both the first electrode terminal connecting plate and the second electrode terminal connecting plate are coupled to an upper end of the cap assembly, other components configuring the battery pack may be disposed on a lower end portion of the cylindrical battery cells, which is opposite to the upper end of the cap assembly, and thus, the structure of the battery pack may be more flexibly configured. As a result, limitations on various shapes of a mounting portion of a device may be easily solved.

In an exemplary embodiment, the first electrode terminal connecting plate may have a plate-type structure and include a through-hole defined in a portion corresponding to a second electrode terminal, so as to be coupled to the upper end surface of the clamping part except for the second electrode terminal of the cylindrical battery cell.

Accordingly, the first electrode terminal connecting plate does not contact or interfere with the second electrode terminal of the cylindrical battery cell or the second electrode terminal connecting plate connected and coupled to the second electrode terminal through the through-hole. Thus, a limitation such as an internal short-circuit that is generated due to the above-described contact or interference may be prevented.

Here, the through-hole may be perforated in each of portions corresponding to those of the welding plate and the conductive plate in a mutual communication manner, and the through-hole perforated in the welding plate may have a relatively small internal diameter in comparison with that of the through-hole perforated in the conductive plate.

Accordingly, the inner-circumferential portion of the through-hole of the welding plate may be exposed from the upper portion through the through-hole of the conductive plate, and, accordingly, through the through-hole, welding of the inner-circumferential portion of the through-hole of the welding plate with respect to the upper end surface of the clamping part may be more easily performed.

In more detail, the through-hole of the welding plate may have a size to be disposed relatively adjacent to an upper end inner-circumference of the clamping part, between the upper end inner-circumference and upper end outer-circumference of the clamping part, so that the inner-circumferential portion of the through-hole of the welding plate contacts the upper end surface of the clamping part of the cap assembly, and the through-hole of the conductive plate may have a size to be disposed relatively adjacent to the upper end outer-circumference of the clamping part, between the upper end outer-circumference of the clamping part and the inner-circumference of the through-hole of the welding plate, so that the inner-circumferential portion of the through-hole of the welding plate, which contacts the upper end surface of the clamping part of the cap assembly, is exposed from the upper portion.

Accordingly, an area of the inner-circumferential portion of the through-hole of the welding plate, which contacts the upper end surface of the clamping part, and an area of the inner-circumferential portion of the through-hole of the welding plate, which is exposed from the upper portion through the through-hole of the conductive plate may be minimized. Thus, welding of the inner-circumferential portion of the through-hole of the welding plate with respect to the upper end surface may be more easily performed, and, at the same time, since a welding area increases, a welding strength of the first electrode terminal connecting plate with respect to the upper end surface of the clamping part may increase, and structural stability may be more enhanced.

Here, the inner-circumferential portion of the through-hole of the welding plate, which is exposed upward through the through-hole of the conductive plate, may have a size that is approximately 10% to approximately 90% of a size of the upper end surface of the clamping part of the cap assembly.

When the inner-circumferential portion of the through-hole of the welding plate, which is exposed upward through the through-hole of the conductive plate, has a size that is excessively small out of the above range, the inner-circumferential portion of the through-hole of the welding plate with respect to the upper end surface of the clamping part of the cap assembly may be difficult to be welded.

On the contrary, when the inner-circumferential portion of the through-hole of the welding plate, which is exposed upward through the through-hole of the conductive plate, has a size that is excessively great out of the above range, since the upper end surface of the clamping part, which contacts the inner-circumferential portion of the through-hole of the welding plate, has an excessively small surface area, the inner-circumferential portion of the through-hole of the welding plate with respect to the upper end surface of the clamping part of the cap assembly may be difficult to be welded, and, as the inner-circumferential portion of the through-hole of the welding plate contacts the second electrode terminal provided on the upper end central portion of the cap assembly, internal short-circuit may be generated.

Meanwhile, the welding plate may have a thickness of approximately 0.1 mm to approximately 0.5 mm.

When the welding plate has a thickness that is less than approximately 0.1 mm, as the thickness of the welding plate becomes excessively thin, the welding plate may be damaged during the welding process of the cap assembly with respect to the upper end surface of the clamping part to generate a welding failure.

On the contrary, when the welding plate has a thickness that is greater than approximately 0.5 mm, as the thickness of the welding plate becomes excessively thick, the welding with respect to the upper end surface of the clamping part of the cap assembly may be difficult, and, as enough welding is not performed, a welding strength may be degraded.

Also, the conductive plate may have a thickness of approximately 1 mm to approximately 10 mm.

When the conductive plate has a thickness less than approximately 1 mm, the thickness of the conductive plate becomes excessively thin, resistance may increase, and, accordingly, smooth current flow between the first electrode terminals through the conductive plate may be difficult.

On the contrary, when the conductive plate has a thickness greater than approximately 10 mm, the thickness of the conductive plate becomes excessively thick, the size of the battery pack may increase, and the capacity of the battery pack may be reduced to be applied in a mounting space of a device.

In an exemplary embodiment, each of the welding plate and the conductive plate may be made of one or more different metal selected from the group consisting of copper, aluminum, nickel, a copper alloy, an aluminum alloy, and a nickel alloy.

In more detail, while the welding plate increases the weldability with respect to the upper end surface of the clamping part of the cap assembly, the conductive plate allows smooth current flow between the first electrode terminals.

In other words, the welding plate and the conductive plate have different functions, and thus, are made of different metal in order to perform the respective function in more excellent manner.

In particular, in consideration of each of the functions of the welding plate and the conductive plate, the welding plate may be made of a material having relatively excellent weldability, e.g., nickel or a nickel alloy, and the conductive plate may be made of one or more metal selected from the group consisting of copper, aluminum, a copper alloy, and an aluminum alloy, each of which has relatively excellent conductivity.

Also, the welding plate and the conductive plate may be coupled to each other through laser welding.

Accordingly, with respect to the rest narrow portion except for the through-hole perforated in each of the welding plate and the conductive plate, an excellent welding quality may be provided through micro-welding, and a failure rate generated during the welding process of the welding plate and the conductive plate may be reduced or eliminated.

Meanwhile, the battery pack further may include: a second electrode terminal connecting plate disposed on a top surface of a first electrode terminal connecting plate, which is opposite to the cap assembly of the cylindrical battery cell, and simultaneously coupled to an upper end central portion of the cap assembly, so as to connect second electrode terminals provided on the upper end central portion of the cap assembly, and an insulation member disposed between the first electrode terminal connecting plate and the second electrode terminal connecting plate, so as to insulate the first electrode terminal connecting plate from the second electrode terminal connecting plate.

In other words, as the battery pack further includes the second electrode terminal connecting plate connected to the upper end of the cap assembly like the first electrode terminal connecting plate, other components configuring the battery pack may be disposed on the lower end portion of each of the cylindrical battery cells, which is opposite to the upper end of the cap assembly, and, accordingly, the structure of the battery pack may be more flexibly configured. Thus, limitations of various shapes of a mounting portion of a device may be solved.

In this case, the second electrode terminal connecting plate may protrude downward so that a connection portion thereof corresponding to a second electrode terminal, which is provided on the upper end central portion of the cap assembly, is coupled to the second electrode terminal in a facing manner.

Accordingly, the connection portion of the second electrode terminal connecting plate corresponding to the second electrode terminal, which is provided on the upper end central portion of the cap assembly, may protrude downward through the through-hole perforated in the first electrode terminal connecting plate to face the second electrode terminal provided on the upper end central portion of the cap assembly in a more easy manner.

Here, a connection portion of the second electrode connecting plate, which is provided on the upper end central portion of the cap assembly on a cross-section in correspondence to the second terminal electrode, may have a size that is approximately 50% to approximately 90% of a size of the inner-circumferential portion of the through-hole perforated in the welding plate of the first electrode terminal connecting plate.

When the connection portion of the second electrode connecting plate, which is provided on the upper end central portion of the cap assembly in correspondence to the second terminal electrode is excessively small out of the above range, a stable welding strength with respect to the second electrode terminal may not be secured, and thus, the structural stability of the battery pack may be degraded.

On the contrary, when the connection portion of the second electrode connecting plate, which is provided on the upper end central portion of the cap assembly in correspondence to the second terminal electrode is excessively great out of the above range, the connection portion of the second electrode terminal connecting plate, which protrudes downward, may directly contact the inner-circumferential portion of the through-hole of the first electrode terminal connecting plate, and thus, internal short-circuit may be generated.

In an exemplary embodiment, the insulation member may be an insulation sheet having a planar structure that is the same as that of the first electrode terminal connecting plate.

That is, the insulation member that is an insulation sheet has a planar structure that is the same as that of the first electrode terminal connecting plate. In more detail, the insulation member may include a through-hole perforated to communicate with the through-hole of the first electrode terminal connecting plate.

Here, the through-hole perforated in the insulation member may have a size that is less than the through-hole of the first electrode terminal connecting plate, especially, the through-hole of the conductive plate, in order to prevent direct contact between the first electrode terminal connecting plate and the second electrode terminal connecting plate and internal short-circuit caused by the direct contact. In more detail, the through-hole perforated in the insulation member may have a size that is approximately 90% to approximately 99% of that of the through-hole of the conductive plate within a range in which the connection portion of the second electrode terminal connecting plate, which protrudes downward, is not interfered, in order to be connected to the second electrode terminal provided on the upper end central portion of the cap assembly.

Also, the insulation sheet may have at least one surface, on which an adhesion material is applied, among both surfaces facing the first electrode terminal connecting plate and the second electrode terminal connecting plate, respectively.

Accordingly, the insulation sheet may restrain movement between the first electrode terminal connecting plate and the second electrode terminal connecting plate, and prevent the direct contact between the electrode terminal connecting plates due to the movement of the insulation sheet and the internal short-circuit caused by the direct contact in a more effective manner.

Since the rest configurations or structures of the battery pack except for the above description are well-known in the technical field to which the present invention belongs, description regarding this will not be provide in this specification.

Advantageous Effects

As described above, the cylindrical battery pack in accordance with an exemplary embodiment includes the first electrode terminal connecting plate that is coupled to the upper end surfaces of the clamping part of the battery cells. The first electrode terminal connecting plate includes the welding plate and the conductive plate, which have different thicknesses from each other.

Accordingly, the welding of the first electrode terminal connecting plate with respect to the upper end surface of the clamping part may be more easily performed through the welding plate, and, at the same time, the current flow between the first electrode terminals may be smoothly performed through the conductive plate, so as to improve stability.

Also, the upper end of the cap assembly is coupled to all of the first electrode terminal connecting plate and the second electrode terminal connecting plate.

Since other components configuring the battery pack may be disposed on the lower end portion of the cylindrical battery cells, which is opposite to the upper end of the cap assembly, through the above-described structure, the structure of the battery pack may be more flexibly configured, and, accordingly, the limitation on the various shapes of the mounting portion of devices may be easily solved.

BRIEF DESCRIPTION OF THE DRAWINGS

FIG. 1 is a schematic vertical cross-sectional view illustrating a structure of a conventional cylindrical battery cell.

FIG. 2 is a schematic view illustrating a structure of a battery pack in accordance with an exemplary embodiment.

FIG. 3 is a schematic plan view illustrating a structure in which a first electrode terminal connecting plate in FIG. 2 is coupled to cap assemblies of cylindrical battery cells.

FIG. 4 is a schematic vertical cross-sectional view illustrating a structure of the battery pack in FIG. 2.

MODE FOR CARRYING OUT THE INVENTION

Hereinafter, specific embodiments will be described in detail with reference to the accompanying drawings. The present invention may, however, be embodied in different forms and should not be construed as limited to the embodiments set forth herein.

FIG. 2 is a schematic view illustrating a structure of a battery pack in accordance with an exemplary embodiment.

Referring to FIG. 2, a battery pack 200 is formed such that a first electrode terminal connecting plate 210, a second electrode terminal connecting plate 240, and an insulation member 250 are coupled to an upper end on which a cap assembly 202 of a cylindrical battery cell 201 is disposed.

The first electrode terminal connecting plate 210 includes a welding plate 220 coupled to an upper end of the cap assembly 202 of the cylindrical battery cell 201 and a conductive pate 230 coupled to a top surface of the welding plate 220.

Through-holes 221 and 231 are perforated in a portion corresponding to a second electrode terminal defined in an upper end central portion of the cap assembly 202 of the cylindrical battery cell 201, on a portion at which the welding plate 220 and the conductive plate 230 correspond to each other.

The insulation member 250 has a sheet shape in which a through-hole 251 is perforated in a portion corresponding to the through-holes 221 and 231 with the same shape.

The second electrode terminal connecting plate 240 is coupled to a top surface of the first electrode terminal connecting plate 210 with the insulation member 250 therebetween.

FIG. 3 is a schematic plan view illustrating a structure in which the first electrode terminal connecting plate in FIG. 2 is coupled to cap assemblies of cylindrical battery cells.

Referring to FIG. 3, a second electrode terminal 213 is provided on the upper end central portion of the cap assembly 202 of the cylindrical battery 201, and a first electrode terminal is provided on an upper end surface 212 of the clamping part, among the rest portion except for the second electrode terminal 213.

Circular through-holes 221 and 231 that communicate with each other are perforated in a portion corresponding to the second electrode terminal 213 of the welding plate 220 and conductive plate 230 of the first electrode terminal connecting plate 210.

The inner-circumferential portion of the through-hole 221 perforated in the welding plate 220 has a diameter D1 that is relatively less than a diameter D2 of the inner-circumferential portion of the through-hole 231 perforated in the conductive plate 230.

Accordingly, the inner-circumferential portion of the through-hole 221 perforated in the welding plate 220 contacts the upper end surface 212 of the clamping part and, simultaneously, be exposed from the upper portion through the through-hole 221 of the conductive plate 230. Thus, welding of the welding plate 220 with respect to the upper end surface 212 of the clamping part may be easily performed.

For one cylindrical battery cell 201, the welding between the welding plate 220 and the upper end surface 212 of the clamping part may be performed on three spaced portions 261, 262, and 263.

FIG. 4 is a schematic vertical cross-sectional view illustrating a structure of the battery pack in FIG. 2.

Referring to FIG. 4, the welding plate 220 of the first electrode terminal connecting plate 210 contacts the upper end surface 212 of the clamping part forming the first electrode terminal of the cylindrical battery cell 201, and the inner-circumferential portion of the through-hole 221 has a size to be disposed adjacent to the inner-circumference of the upper end surface 212 of the clamping part.

The conductive plate 230 of the first electrode terminal connecting plate 210 is coupled to the top surface of the welding plate 220, and the inner-circumferential portion of the through-hole 231 has a size to be disposed adjacent to the outer-circumference of the upper end surface 212 of the clamping part.

Accordingly, since the inner-circumferential portion of the through-hole 221 of the welding plate 220 is exposed from the upper portion through the through-hole 231 of the conductive plate 230, a welding for the upper end surface 212 of the clamping part may be more easily performed.

The conductive plate 230 has a structure that is relatively thicker than that of the welding plate 220.

The insulation member 250 is disposed on the top surface of the conductive plate 230 between the conductive plate 230 and the second electrode terminal connecting plate 240, and includes a through-hole 251 having a size that is relatively less than that of the through-hole 231 of the conductive plate 230.

Accordingly, the insulation member 250 may stably insulate the second electrode terminal connecting plate 240 from the conductive plate 230 of the first electrode terminal connecting plate 210.

The second electrode terminal connecting plate 240 has a connection portion 241 coupled to the second electrode terminal 213 of the cylindrical battery cell 201. The connection portion 241 protrudes downward through the through-hole 251 of the insulation member 250 and the through-holes 221 and 231 of the first electrode terminal connecting plate 210 and is connected to the second electrode terminal 213 of the cylindrical battery cell 201.

Although the battery pack has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:
1. A battery pack comprising:
  a plurality of cylindrical battery cells, each battery cell having a clamping part formed by coupling a cap assembly on one opened surface of a cylindrical can and a first electrode terminal and a second electrode terminal on a top surface of the clamping part and a top end central portion of the cap assembly, respectively; and
  a first electrode terminal connecting plate simultaneously coupled to upper end surfaces of the clamping parts of the battery cells in a state in which the cylindrical battery cells are laterally arranged so that the cap assemblies of the cylindrical battery cells head in the same direction,
  wherein the plurality of cylindrical battery cells includes three or more cylindrical battery cells, and
  wherein the first electrode terminal connecting plate comprises:
    a single welding plate having a relatively thin thickness to be welded on the upper end surface of the clamping parts of the cap assemblies of all the plurality of cylindrical battery cells; and
    a single conductive plate coupled to a top surface of the welding plate, which is opposite to the cap assembly, the conductive plate having a relatively thick thickness in comparison with that of the welding plate for smooth current flow between first electrode terminals of the upper end surface of each clamping part, and the conductive plate extending between all the plurality of cylindrical battery cells,
  wherein the first electrode terminal connecting plate has a plate-type structure and comprises a through-hole defined in a portion corresponding to a second electrode terminal, so as to be coupled to the upper end surface of the clamping part except for the second electrode terminal of the cylindrical battery cell,
  wherein the through-hole is perforated in each of portions corresponding to those of the welding plate and the conductive plate in a mutual communication manner, and
  wherein the through-hole perforated in the welding plate has a relatively small internal diameter in comparison with that of the through-hole perforated in the conductive plate.

2. The battery pack of claim 1, wherein the through-hole of the welding plate has a size to be disposed relatively adjacent to an upper end inner-circumference of the clamping part, between the upper end inner-circumference and an upper end outer-circumference of the clamping part, so that an inner-circumferential portion of the through-hole of the welding plate contacts the upper end surface of the clamping part of the cap assembly, and the through-hole of the conductive plate has a size to be disposed relatively adjacent to the upper end outer-circumference of the clamping part, between the upper end outer-circumference of the clamping part and the inner-circumference of the through-hole of the welding plate, so that the inner-circumferential portion of the through-hole of the welding plate, which contacts the upper end surface of the clamping part of the cap assembly, is exposed from the upper portion.

3. The battery pack of claim 2, wherein the inner-circumferential portion of the through-hole of the welding plate, which is exposed upward through the through-hole of the conductive plate, has a size that is approximately 10% to approximately 90% of a size of the upper end surface of the clamping part of the cap assembly.

4. The battery pack of claim 1, wherein the welding plate has a thickness of approximately 0.1 mm to approximately 0.5 mm.

5. The battery pack of claim 1, wherein the conductive plate has a thickness of approximately 1 mm to approximately 10 mm.

6. The battery pack of claim 1, wherein each of the welding plate and the conductive plate is made of one or more different metal selected from copper, aluminum, nickel, a copper alloy, an aluminum alloy, and a nickel alloy.

7. The battery pack of claim 1, wherein the welding plate and the conductive plate are coupled to each other through laser welding.

8. The battery pack of claim 1, wherein the battery pack further comprises:

a second electrode terminal connecting plate disposed on a top surface of the first electrode terminal connecting plate, which is opposite to the cap assembly of the cylindrical battery cell, and simultaneously coupled to an upper end central portion of the cap assembly, so as to connect second electrode terminals provided on the upper end central portion of the cap assembly, and an insulation member disposed between the first electrode terminal connecting plate and the second electrode terminal connecting plate, so as to insulate the first electrode terminal connecting plate from the second electrode terminal connecting plate.

9. The battery pack of claim 8, wherein the second electrode terminal connecting plate protrudes downward so that a connection portion thereof corresponding to a second electrode terminal, which is provided on the upper end central portion of the cap assembly, is coupled to the second electrode terminal in a facing manner.

10. The battery pack of claim 9, wherein a connection portion of the second electrode connecting plate, which is provided on the upper end central portion of the cap assembly on a cross-section in correspondence to the second terminal electrode, has a size that is approximately 50% to approximately 90% of a size of an inner-circumferential portion of the through-hole perforated in the welding plate of the first electrode terminal connecting plate.

11. The battery pack of claim 8, wherein the insulation member is an insulation sheet having a planar structure that is the same as that of the first electrode terminal connecting plate.

12. The battery pack of claim 11, wherein the insulation sheet has at least one surface, on which an adhesion material is applied, among both surfaces facing the first electrode terminal connecting plate and the second electrode terminal connecting plate, respectively.

13. The battery pack of claim 1, wherein the plurality of cylindrical battery cells are provided in an array of at least two by two.

* * * * *